Nov. 30, 1965    TOMOKICHI TANGO ETAL    3,221,243
SINGLE PHASE-THREE PHASE CONVERTING DEVICE
Filed Feb. 27, 1962    2 Sheets-Sheet 1

INVENTOR.
Tomokichi Tango
Takeshi Anayama
Eijiro Miyazawa
Hiroshi Kobayashi
BY
Wendworth, Lind + Ponack, Attorneys Nov. 30, 1965  TOMOKICHI TANGO ETAL  3,221,243
SINGLE PHASE-THREE PHASE CONVERTING DEVICE
Filed Feb. 27, 1962  2 Sheets-Sheet 2

INVENTOR.
Tomokichi Tango
Takeshi Anayama
BY Eijiro Miyazawa
Hiroshi Kobayashi

Wendroth, Lind & Ponack, attorneys

United States Patent Office 3,221,243
Patented Nov. 30, 1965

3,221,243
SINGLE PHASE-THREE PHASE
CONVERTING DEVICE
Tomokichi Tango, Fujisawa, Kanagawa, Japan; Hiroshi Kobayashi, 75 Shimohirama, Kawasaki, Kanagawa, Japan; Takeshi Anayama, Sendai, Miyagi, Japan; and Eijiro Miyazawa, 435 Nakasenkawa, Mitaka, Tokyo, Japan; said Tango and said Anayama assignors to said Kobayashi and said Miyazawa
Filed Feb. 27, 1962, Ser. No. 176,074
Claims priority, application Japan, Mar. 1, 1961, 36/6,740, 36/6,743; Mar. 10, 1961, 36/7,989; June 21, 1961, 36/21,345, 36/21,346
14 Claims. (Cl. 321—58)

This invention relates to a device for converting the number of phases from a single phase to three phases or from three phases to a single phase. More particularly the present invention relates to a new and improved single phase-three phase converting device consisting of linear reactors, three sets of saturable reactors and parallel resonance condensers.

Many single phase-three phase converting devices have been already suggested. While many of those known devices are satisfactory to some applications, they have a number of limitations inherent to their design and making them impractical in many cases due to their inefficiency, slow response, output wave distortion, poor electrical characteristics and so forth. For example, in obtaining three phases from a single phase, there has been adopted such troublesome method as using a rotating machine. Therefore, for example, in the case of driving an induction motor with a single phase, the characteristics of the motor will be sacrificed.

A main object of the present invention is to provide a single phase-three phase or three phase-single phase converting device wherein the defects of known devices are eliminated, the output voltages are well balanced in the former case and input currents are well balanced in the latter case; and a constant sinusoidal output voltage can be obtained in both cases.

The features and advantages of the present invention will be made clear by the following description with reference to the accompanying drawings wherein.

Figure 8A:
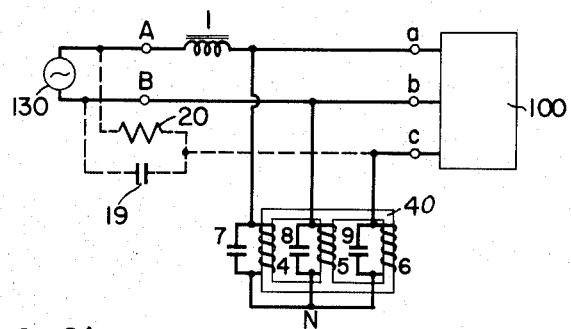

FIGURES 8a, b and c are circuit diagrams of embodiments of the present invention showing circuits for conversion from a single phase to three phases and having phase rotation determining circuits.

Figure 8B:
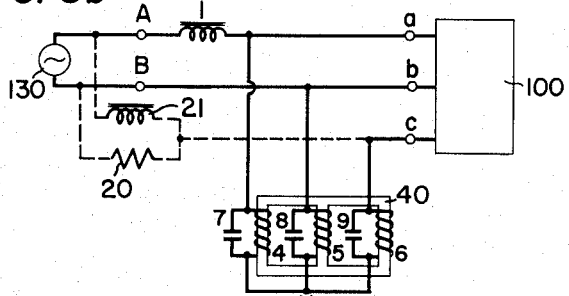
Figure 8C:
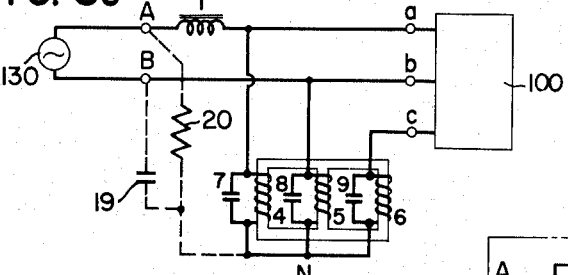
Figure 9:
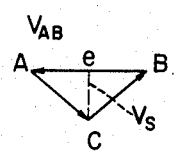

FIGURE 9 is a vector diagram explaining the operation of the circuit in FIGURE 8.

Figure 1:
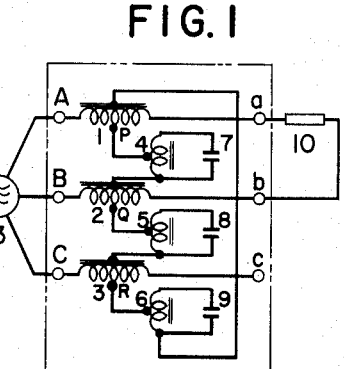
FIGURE 1 is a circuit diagram of an embodiment of a single-phase to three-phase converter according to the present invention.

As seen in FIG. 1, linear reactors 1, 2 and 3 having air gaps are connected in parallel between input terminals A, B and C for a three-phase alternating current voltage source 133, and output terminals a, b and c. Saturable reactors 4, 5 and 6 are connected in parallel with condensers 7, 8 and 9 respectively to form three resonant tank circuits, each tank circuit having one side connected to a point intermediate the ends of the respective linear reactors. The other sides of the three tank circuits are delta connected through the points P, Q and R of the windings of the three linear reactors 1, 2 and 3, the connections constituting coupling means for equalizing the flux in the saturable reactors. When a single phase load 10 is connected across two of the output terminals a, b and c, third harmonics will be able to be circulated through the delta-connected circuit formed by the three tank circuits and cannot flow in the output circuit. Therefore the higher harmonics in the wave form of the output voltage will be reduced and the balance of the three phases on both the source and the load sides will be improved.

Figure 2:
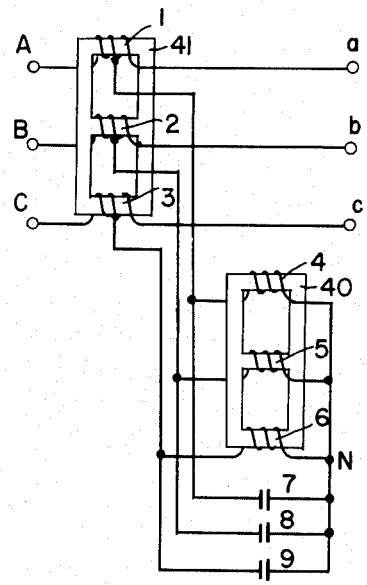
FIGURE 2 is a circuit diagram of an embodiment of a single phase to three phase converter according to the present invention wherein the windings of the reactors are wound on the respective legs of a three-leg type core.

As seen in FIG. 2, linear reactors 1, 2 and 3 are wound on the respective legs of a three-leg core 41 which serves as a coupling means for equalizing the flux in the linear reactors. Saturable reactors 4, 5 and 6 are wound on the respective legs of a three-leg core 40 which serves as a coupling means for equalizing the flux in the saturable reactors. The linear reactors 1, 2 and 3 are connected in parallel between input terminals A, B and C and output terminals a, b and c respectively. The saturable reactors 4, 5 and 6 are connected in parallel with condensers 7, 8 and 9 respectively to form three resonant tank circuits, each tank circuit having one side connected to a point intermediate the ends of the respective linear reactors 1, 2 and 3. The other sides of the tank circuits are star connected to point N. In this circuit, when a single phase alternating current source voltage is applied to any two of terminals A, B and C and a three-phase load is connected to the load side at terminals a, b and c, respectively, a symmetrical three-phase alternating current voltage will be generated on the load side. Thus, when obtaining a three-phase alternating voltage output from a single phase supply, the unbalance of the three-phase alternating voltage can be greatly reduced. Alternately, when a three-phase alternating current source voltage is connected to the terminals A, B and C and a single-phase load is connected across two of the terminals a, b and c, a symmetrical single-phase alternating current voltage will be generated on the load side. Thus, when obtaining a single-phase alternating voltage output from a three-phase supply, the unbalance in the currents can be greatly reduced.

Though the complete theoretical explanation of the principle of the present invention is difficult to express, it is thought that the operating principle is as follows. First of all, when a three-phase alternating voltage is applied to the terminals A, B and C in FIGURE 1, the circuit shown in FIGURE 1 will operate as a three-phase ferro-resonance circuit. Since the saturatable reactors 4, 5 and 6 are star-connected at an intermediate-point N, the third harmonics can not be contained in the exciting current flowing in these saturable reactors and hence the current becomes substantially sinusoidal. Moreover, if the voltage applied to the terminals A, B and C rises, the exciting current of sinusoidal wave form in the saturable reactors will increase so much that a voltage drop will occur in the linear reactors 1, 2 and 3 so as to keep the voltage of the terminals a, b and c on the load side constant. On the contrary, if the voltage of the alternating voltage source is too low, the exciting current of the saturable reactors will be reduced and the leading current passing through the condenser will become relatively larger. Therefore, the voltage will rise in the linear reactors so as to keep the voltage at the terminals a, b and c constant. Such characteristics of keeping the output voltage constant are maintained even if the source voltage is an unbalanced three-phase alternating voltage or even when the input voltage is single phase. Thus a balanced three-phase alternating current source can be obtained from a single phase.

Figure 3:
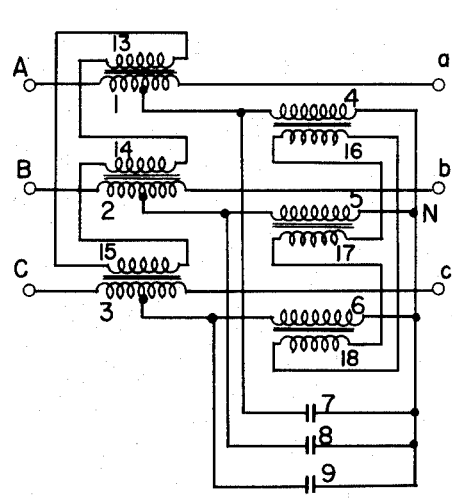
FIGURE 3 is a circuit diagram of an embodiment of the invention in which secondary windings which are delta connected are coupled to the reactors.

FIGURE 3 shows a circuit diagram of still another embodiment of the present invention. In the embodiment shown in FIGURE 3, secondary windings 13, 14 and 15 are applied to the linear reactors 1, 2 and 3, respectively, as a coupling means and are delta-connected so that the algebraic sum of the magnetic flux at any instant in the three linear reactors may always be substantially zero. Secondary windings 16, 17 and 18 are also applied to the saturable reactors 4, 5 and 6, respectively, as a coupling means and are delta-connected so that the algebraic sum of the magnetic fluxes at any instant in the three saturable reactors may be always substantially zero. Therefore, the embodiment shown in FIGURE 3 can operate the same as the embodiment shown in FIGURE 2.

Figure 4:
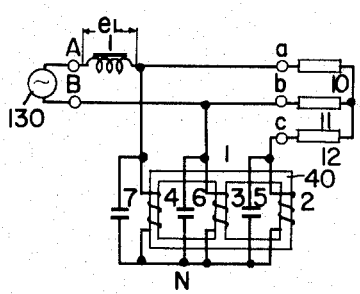
FIGURES 4, 5 and 6 show embodiments of the present invention wherein two linear reactors are eliminated in the apparatus for converting a single phase to three phases.

FIGURE 4 also shows a circuit diagram of a modified embodiment of the present invention. The embodiment in FIGURE 4 is a single phase-three phase converting device intended to obtained a balanced three phase output voltage from a single-phase alternating current voltage source. 10, 11 and 12 is a load. In the case of such object, only any two sets of the three linear reactors 1, 2 and 3 in the device in FIGURES 2 and 3 will be actually used and the other will be as if it no longer is present. Therefore, by noting that said two sets can be combined into one, the linear reactors have been improved into one set. Further, the windings of saturable reactors 4, 5 and 6 are wound on a 3 leg core which serves as a coupling means as in the embodiment of FIG. 2.

Figure 5:
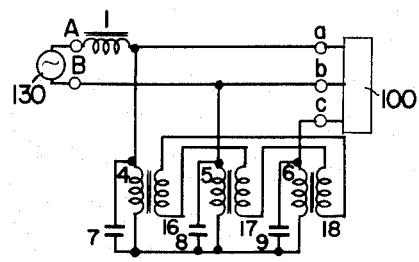
Figure 6:
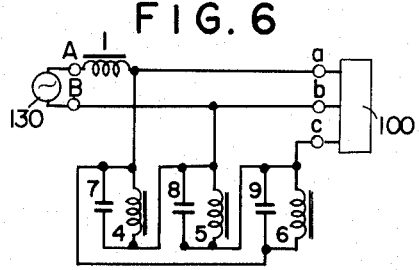

FIGURES 5 and 6 show circuit diagrams of embodiments wherein the linear reactors are reduced to one set as in the embodiment shown in FIGURE 4. 100 is a load. In the saturable reactors shown in FIGURE 4, a three-leg type core is used, whereas, in FIGURE 5, by delta-connecting the secondary windings 16, 17 and 18 of the saturable reactors, the connections serving as coupling means, three individual saturable reactors in which the magnetic circuits are separated from one another are used so as to have the same effect as in FIG. 4.

In the embodiment shown in FIGURE 6, the same effect as of the embodiment shown in FIGURE 5 is realized by delta-connecting the primary windings of the saturable reactors, the connections serving as coupling means.

Now the phenomena at the instant of switching on of the above described single phase-three phase converting device shall be considered.

Figure 7:
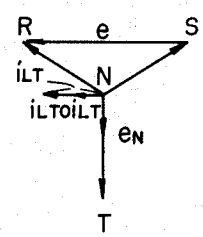
FIGURE 7 is a vector diagram explaining the operation of the present invention in conversion from a single phase to three phases.

In the circuits shown in FIGURES 1 to 6, when a single-phase alternating voltage from a source 130 is quickly applied at the start of operation to the terminals A and B, and if C phase voltage is generated in saturable reactor 4 even in a small amount by any cause, the C phase voltage will be increased by the self-exciting action of the C phase condenser 9 so as to approach the normal voltage determined by the characteristics of the tank circuits. However, at the time of switching in the seed of the C phase voltage may well be produced in the direction as shown FIGURE 7. Therefore, the phase rotation of the generated three-phase voltage may be either normal or reverse. Thus, when a three-phase motor is used as a load for the three-phase output, there will be a defect that the direction of the rotation of the motor can not be anticipated. The present invention further includes a starting circuit for eliminating such defect and generating any desired phase rotation.

FIGURE 8 shows circuit diagrams of embodiments having a phase rotation determining circuit. In FIGURE 8a, a series circuit consisting of a condenser 19 and a resistor 20 is inserted between terminals A and B and the junction point of the condenser 19 and resistor 20 is connected between one end of the tank circuit of a C phase and output terminal C. The role played by this phase shifting circuit is that, as shown in the vector diagram in FIGURE 9, as the potential of the connection point comes on a semi-circle whose diameter is $V_{AB}$ and thus the said seed voltage $V_S$ is supplied to saturable reactor 6. The phase rotation is thus determined by the direction of seed vector $V_S$. By reversing the connection of the condenser 19 and resistor 20 to the terminals A and B, the phase rotation of the three-phase voltage will be reversed.

FIGURE 8b is a circuit diagram in the case that the voltage division between the terminals A and B is made by the resistor 19 and inductance 20 on the basis of the same principle as in FIGURE 8a.

FIGURE 8c is of the case wherein the junction point of the voltage dividing circuit of the condenser 19 and resistor 20 in FIGURE 8a is connected to the neutral point N of the star-connection of the tank circuit. Needless to say the phase shifting circuit consisting of the condenser 19 and resistor 20 in FIGURE 8c can be operated by the resistance and inductance.

Applications of the single phase-three phase converting device according to the present invention are considered to be as follows. Some protecting relays for such electric machines as for power generating stations or substations are required to operate correctly even when any one line of the three-phase alternating current voltage source is accidentally disconnected or grounded and the source is substantially of a single phase voltage. The present invention provides an electric voltage source device to meet such requirement.

A single-phase power of a large capacity is required with the alternating current electrification of railways. On the other hand a powerful three phase voltage source is required in A.C. railways cars. The devices in the present invention serve for these cases.

Several embodiments of the new and improved single phase-three phase converting device constructed in accordance with the invention having been described, it is believed obvious that other modifications and variations of the invention are possible in the light of the above teachings. It should, therefore, be understood that changes may be made in particular embodiments of the invention within the full intended scope of the invention as defined by the appended claims.

What we claim is:

1. A converter for converting a single phase voltage to a three phase balanced and constant voltage having a sinusoidal form and the same frequency as the single phase voltage, or for converting a three phase voltage to a single phase constant voltage having a sinusoidal form and the same frequency as the three phase voltage and without effecting an unbalance in the input currents, said converter comprising at least two input terminals and three output terminals, at least one linear reactor, said reactor being coupled between the first input terminal and the first output terminal, the second input terminal being connected to the second output terminal, and three tank circuits each having a saturable reactor and a condenser connected in parallel to form a resonant circuit, one side of the first and second tank circuits being coupled to the coupling between the first input and output terminals and the second input and output terminals respectively, and the third tank circuit having one side coupled to the third output terminal, and the other sides of said tank circuits being coupled to each other and coupling means coupling at least the saturable reactors of the tank circuits with each other for equalizing the fluxes in the saturable reactors.

2. A converter for converting a single phase voltage to a three phase balanced and constant voltage having a sinusoidal form and the same frequency as the single phase voltage, or for converting a three phase voltage to a single phase constant voltage having a sinusoidal form and the same frequency as the three phase voltage and without effecting an unbalance in the input currents, said converter comprising three input terminals and three output terminals, three linear reactors, one coupled between each corresponding input and output terminal, three tank circuits each having a saturable reactor and a condenser connected in parallel to form a resonant circuit, one side of each tank circuit coupled to a corresponding coupling between an input and an output terminal at a point between the end of the linear reactor in the said corresponding coupling which is toward the input terminal and the output terminal, and the other sides of the tank circuits being coupled to each other, and coupling means coupling at least the saturable reactors of the tank circuits with each other for equalizing the fluxes in the saturable reactors.

3. A converter as claimed in claim 2 in which the coupling means comprises a three leg magnetic core and the windings of the saturable reactors are wound on the respective legs of said core.

4. A converter as claimed in claim 2 in which said coupling means is three secondary windings connected in series, said secondary windings being wound on common cores with the respective windings of the saturable reactors.

5. A converter for converting a single phase voltage to a three phase balanced and constant voltage having a sinusoidal form and the same frequency as the single phase voltage, or for converting a three phase voltage to a single phase constant voltage having a sinusoidal form and the same frequency as the three phase voltage and without effecting an unbalance in the input currents, said converter comprising three input terminals and three output terminals, three linear reactors, one coupled between each corresponding input and output terminal, three tank circuits each having a saturable reactor and a condenser connected in parallel to form a resonant circuit, one side of each tank circuit coupled to a corresponding coupling between an input and an output terminal at a point between the end of the linear reactor in the said corresponding coupling which is toward the input terminal and the output terminal, and the other sides of the tank circuits being coupled to each other, and coupling means coupling the saturable reactors of the tank circuits with each other for equalizing the fluxes in the saturable reactors and further coupling means coupling the linear reactors with each other for equalizing the fluxes in the linear reactors.

6. A converter as claimed in claim 5 in which each coupling means comprises a three leg magnetic core, the windings of the saturable reactors being wound on the respective legs of one core and the windings of the linear reactors being wound on the respective legs of the other cores.

7. A converter as claimed in claim 5 in which each coupling means is three secondary windings connected in series, the secondary windings of one coupling means being wound on common cores with the respective windings of the saturable reactors and the secondary windings of the further coupling means being wound on common cores with the respective windings of the linear reactors.

8. A converter for converting a single phase voltage to a three phase balanced and constant voltage having a sinusoidal form and the same frequency as the single phase voltage, and without effecting an unbalance in the input currents, said converter comprising two input terminals and three output terminals, a linear reactor coupled between the first input terminal and the first output terminal, the second input terminal being connected to the second output terminal, and three tank circuits each having a saturable reactor and a condenser connected in parallel to form a resonant circuit, one side of the first and second tank circuits being coupled to the coupling between the first input and output terminals and the second input and output terminals respectively, and the third tank circuit having one side coupled to the third output terminal, the other sides of the tank circuits being coupled to each other in a star connection, and a three leg magnetic core having the windings of the saturable reactors wound on the respective legs of said core.

9. A converter for converting a single phase voltage to a three phase balanced and constant voltage having a sinusoidal form and the same frequency as the single phase voltage, or for converting a three phase voltage to a single phase constant voltage having a sinusoidal form and the same frequency as the three phase voltage and without effecting an unbalance in the input currents, said converter comprising at least two input terminals and three output terminals, at least one linear reactor, said reactor being coupled between the first input terminal and the first output terminal, the second input terminal being connected to the second output terminal, and three tank circuits each having a saturable reactor and a condenser connected in parallel to form a resonant circuit, one side of the first and second tank circuits being coupled to the coupling between the first input and output terminals and the second input and output terminals respectively, and the third tank circuit having one side coupled to the third output terminal, and the other sides of said tank circuits being coupled to each other, and coupling means coupling at least the saturable reactors of the tank circuits with each other for equalizing the fluxes in the saturable reactors and a phase shifting circuit coupled between the input terminals and the tank circuits.

10. A converter as claimed in claim 9 in which said phase shifting circuit comprises a resistance having one end coupled to one input terminal and a capacitor having one side coupled to the other input terminal, the other end of the resistance and the other side of the capacitor being coupled and coupled to said tank circuits.

11. A converter as claimed in claim 10 in which tank circuits are star connected and the coupling of the other side of the capacitor and the other end of the resistance is to the coupling between the one side of the third tank circuit and the third output terminal.

12. A converter as claimed in claim 10 in which the tank circuits are star connected and the coupling of the other side of the capacitor and the other end of the resistance is to the neutral point of the star connection of the tank circuits.

13. A converter as claimed in claim 9 in which said phase shifting circuit comprises a reactor having one end coupled to one input terminal and a resistance having one end coupled to the other input terminal, the other ends of the reactor and the resistance being coupled and coupled between the one side of the third tank circuit and the third output terminal.

14. A converter as claimed in claim 2, in which the coupling means is three saturable reactors connected in series forming a delta connection.

References Cited by the Examiner

UNITED STATES PATENTS

| | | | |
|---|---|---|---|
| 2,727,159 | 12/1955 | Sunderlin | 321—7 |
| 2,911,582 | 11/1959 | Kellogg | 321—58 |
| 3,040,230 | 6/1962 | Biringer | 321—58 |

LLOYD McCOLLUM, *Primary Examiner.*

UNITED STATES PATENT OFFICE
CERTIFICATE OF CORRECTION

Patent No. 3,221,243                          November 30, 1965

Tomokichi Tango et al.

It is hereby certified that error appears in the above numbered patent requiring correction and that the said Letters Patent should read as corrected below.

In the grant, lines 4 and 5, strike out "Japan; said Tango and said Anayama assignors to said Kobayashi and said Miyazawa" and insert instead -- Japan, assignors, by direct and mesne assignments, to Yawata Iron & Steel Co., Ltd., of Tokyo, Japan --; line 14, for "Hiroshi Kobayashi and Eijiro Miyazawa, their heirs" read -- Yawata Iron & Steel Co., Ltd., its successors --; and in the heading to the printed specification, line 5, strike out "75 Shimohirama,"; line 7, strike out "435 Nakasemkawa,"; lines 8 and 9, for "Japan; said Tango and said Anayama assignors to said Kobayashi and said Miyazawa" read -- Japan, assignors, by direct and mesne assignments, to Yawata Iron & Steel Co., Ltd., Tokyo, Japan --.

Signed and sealed this 5th day of September 1967.

(SEAL)
Attest:

ERNEST W. SWIDER                          EDWARD J. BRENNER
Attesting Officer                       Commissioner of Patents